United States Patent
Amtmann (10) Patent No.: US 6,559,754 B1
(45) Date of Patent: May 6, 2003

(54) SYSTEM FOR THE TRANSMISSION OF DATA FROM A DATA CARRIER TO A STATION BY MEANS OF ONE OR AT LEAST ONE OTHER AUXILIARY CARRIER SIGNAL

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/357,270

(22) Filed: Jul. 20, 1999

(30) Foreign Application Priority Data

Jul. 21, 1998 (EP) .............................. 98890215

(51) Int. Cl.⁷ ................................. H04Q 5/22
(52) U.S. Cl. ................ 340/10.51; 340/572.1; 340/10.1
(58) Field of Search ............ 340/10.51, 572.1, 340/825.56, 10.1; 342/42, 44, 51; 455/501, 101

(56) References Cited

U.S. PATENT DOCUMENTS

| 5,345,231 | A | | 9/1994 | Koo et al. ............. 340/870.31 |
| 5,748,915 | A | * | 5/1998 | Iijima .......................... 395/285 |
| 6,028,503 | A | * | 2/2000 | Preishuberpfluigl ........ 340/10.4 |
| 6,049,292 | A | * | 4/2000 | Einfeldt et al. ........ 340/825.54 |
| 6,167,094 | A | * | 12/2000 | Reiner ......................... 375/258 |
| 6,265,963 | B1 | * | 7/2001 | Wood, Jr. .................. 340/10.4 |

FOREIGN PATENT DOCUMENTS

EP 0845751 A1 6/1998 ............ G06K/7/08

* cited by examiner

*Primary Examiner*—Michael Horabik
*Assistant Examiner*—Vernal Brown
(74) *Attorney, Agent, or Firm*—Michael Ure (57) ABSTRACT

Data transmission from a data carrier (D) to a station (1) normally takes place by load modulation of a non-modulated carrier signal (CS) by means of an auxiliary carrier signal (SCS1), test means provided in the station then test the correct data transmission and, upon detection of disturbed data transmission, a change over is made to an other transmission mode in which data transmission takes place from the data carrier (D) to the station (1) by means of load modulation of the non-modulated carrier signal (CS) by means of at least one other auxiliary carrier signal (SCS2).

16 Claims, 3 Drawing Sheets

SYSTEM FOR THE TRANSMISSION OF DATA FROM A DATA CARRIER TO A STATION BY MEANS OF ONE OR AT LEAST ONE OTHER AUXILIARY CARRIER SIGNAL

The invention relates to a method for the contactless transmission of data from a data carrier to a write/read station, wherein the write/read station generates a carrier signal and the generated carrier signal is applied to contactless operative transmitter means of the write/read station, wherein a carrier signal is obtained in the data carrier by means of contactless operative transmitter means of the data carrier which are coupled to the transmitter means of the write/read station in a contactless manner, wherein load modulation of the carrier signal is performed by means of one auxiliary carrier signal in a transmission mode for the transmission of a data block from the data carrier to the write/read station, wherein the carrier signal load modulated by means of the one auxiliary carrier signal is demodulated by means of demodulation means in the write/read station in order to obtain the transmitted data block, wherein a test is performed in the write/read station in order to determine whether disturbances occur in the signal path beyond the demodulation means, and wherein control information is generated upon detection of disturbances.

The invention also relates to a write/read station for the contactless reception of data from a data carrier, which station includes carrier signal generating means for generating a carrier signal and contactless operative transmitter means which can be supplied with the carrier signal and can be coupled to contactless operative transmitter means of the data carrier in a contactless manner so that a carrier signal can be obtained in the data carrier by means of the transmitter means of the data carrier, in which load modulation of the carrier signal can be performed by means of one auxiliary carrier signal in a transmission mode for the transmission of a data block from the data carrier to the write/read station, includes demodulation means for demodulating the carrier signal load modulated by means of the one auxiliary carrier signal, which demodulation means can output a data block transmitted from the data carrier to the write/read station, and includes test means which are arranged to test whether disturbances occur in the signal path beyond the demodulation means and to generate control information upon detection of disturbances.

The invention also relates to a data carrier for the contactless output of data to a write/read station, which data carrier includes contactless operative transmitter means which can be coupled to contactless operative transmitter means of the write/read station, where a carrier signal generated in the write/read station can be obtained in the data carrier in the coupled state, and also includes load modulation means whereby the carrier signal can be load modulated by means of one auxiliary carrier signal in a transmission mode for the transmission of a data from the data carrier to the write/read station.

The invention also relates to an integrated circuit for a data carrier for the contactless output of data to a write/read station, which circuit includes connection means for the connection of contactless operative transmitter means which can be coupled to contactless operative transmitter means of the write/read station, where a carrier signal generated in the write/read station can be obtained in the circuit in the coupled state, and also includes load modulation means whereby the carrier signal can be load modulated by means of one auxiliary carrier signal in a transmission mode for the transmission of a data block from the circuit to the write/read station.

In the context of the present invention reference is made to a data carrier system which is realized in many versions and is marketed by the present Applicant so that it is known. In addition to this known data carrier system, reference is made to the patent document U.S. Pat. No. 5,345,231, whose publication is incorporated herein by way of reference. In the known data carrier system a carrier signal which is generated in the write/read station and inductively obtained in the data carrier is subjected to load modulation by means of an auxiliary carrier signal in order to transmit digital data, i.e. data blocks, from a data carrier to a write/read station; the auxiliary carrier signal then has an auxiliary carrier frequency f1 of 423.75 kHz and the ratio of this auxiliary carrier frequency f1 to the carrier frequency f0 of the carrier signal amounts to an integer number. A "0" bit, for example, is then transmitted from the data carrier to the write/read station by load modulation of the carrier signal by means of the auxiliary carrier signal during the first bit half and by omission of load modulation of the carrier signal during the second bit half, whereas a "1" bit is transmitted from the data carrier to the write/read station by omission of load modulation of the carrier signal during the first bit half and by load modulation of the carrier signal by means of the auxiliary carrier signal during the second bit half. If at least one disturbance occurs during the execution of the data transmission from the data carrier to the write/read station, and hence, for example an error in the data transmission, such a disturbance is detected by means of test means which are included in the write/read station and are formed, for example by a logic circuit or a microcomputer or a CRC stage (Cross Redundancy Check stage); these test means generate control information upon detection of disturbances. In the known data carrier system this control information is used exclusively for indication purposes in order to draw the attention of a user of the data carrier system to a disturbed or incorrect operation. A user of the known data carrier system can then attempt to take steps so as to avoid the further occurrence of such disturbances. This is experienced as a nuisance which actually constitutes a shortcoming that cannot be eliminated by numerous users.

It is an object of the invention to avoid the described problems and to provide, in a simple manner and using simple means, an improved write/read station of the kind set forth in the second paragraph, an improved data carrier of the kind set forth in the third paragraph as well as an improved integrated circuit of the kind set forth in the fourth paragraph, so that application of these improved means enables execution of an improved method of the kind set forth in the first paragraph.

In order to achieve the described object a method of the kind set forth in the first paragraph according to the invention is characterized in that at least one transmission mode data block is generated as control information, that the transmission mode data block is transmitted to the data carrier, that the transmitted transmission mode data block is evaluated in the data carrier and that, in conformity with the evaluation of the transmitted transmission mode data block, the data carrier is controlled to an other transmission mode in which, in order to transmit a data block from the data carrier to the write/read station, load modulation of the carrier signal is performed by means of at least one other auxiliary carrier signal, the at least one frequency of the at least one other auxiliary carrier signal and the frequency of the one auxiliary carrier signal having different values.

In order to achieve the described object a write/read station of the kind set forth in the second paragraph according to the invention is characterized in that the test means are arranged to generate at least one transmission mode data block as control information whereby in the data carrier an other transmission mode can be activated in which load modulation of the carrier signal can be performed by means of at least one other auxiliary carrier signal in order to transmit a data block from the data carrier to the write/read station, the at least one frequency of the at least one other auxiliary carrier signal and the frequency of the one auxiliary carrier signal having different values.

In order to achieve the described object a data carrier of the kind set forth in the third paragraph according to the invention is characterized in that the data carrier includes evaluation means for evaluating a transmission mode data block which is transmitted to the data carrier by the write/read station and can control the data carrier to an other transmission mode in which load modulation of the carrier signal by means of at least one other auxiliary carrier signal can be performed in order to transmit a data block from the data carrier to the write/read station, and that the data carrier includes control means which can be influenced by the evaluation means and whereby the data carrier can be controlled, in conformity with an evaluated transmission mode data block, to an other transmission mode in which, in order to transmit a data block from the data carrier to the write/read station, load modulation of the carrier signal can be performed by means of at least one other auxiliary carrier signal, the at least one frequency of the at least one other auxiliary carrier signal and the frequency of the one auxiliary carrier signal having different values.

In order to achieve the described object an integrated circuit of the kind set forth in the fourth paragraph according to the invention is characterized in that the circuit includes evaluation means for evaluating a transmission mode data block which is transmitted to the circuit by the write/read station and can control the circuit to an other transmission mode in which load modulation of the carrier signal can be performed by means of at least one other auxiliary carrier signal in order to transmit a data block from the circuit to the write/read station, and that the circuit includes control means which can be influenced by the evaluation means and whereby the circuit can be controlled, in conformity with an evaluated transmission mode data block, to an other transmission mode in which, in order to transmit a data block from the circuit to the write/read station, load modulation of the carrier signal can be performed by means of at least one other auxiliary signal, the at least one frequency of the at least one other auxiliary carrier signal and the frequency of the one auxiliary carrier signal having different values.

Using very few additional means, the steps according to the invention simply ensure that, after the detection of an error in the data transmission from a data carrier according to the invention to a write/read station according to the invention, the write/read station can influence the data carrier, that is to say in such a manner that, instead of a data transmission by load modulation of a carrier signal by means of one auxiliary carrier signal, switching over to a data transmission by load modulation of a carrier signal by means of at least one other auxiliary carrier signal takes place. In other words, the data transmission from a data carrier according to the invention to a write/read station according to the invention is enabled in one transmission mode by load modulation of a carrier signal by means of one auxiliary carrier signal and in other transmission modes by load modulation of a carrier signal by means of at least one other auxiliary carrier signal. In an other transmission mode load modulation of the carrier signal can be advantageously performed by means of only the other auxiliary carrier signal. In an other transmission mode, however, load modulation of the carrier signal can also be advantageously performed by means of the one auxiliary carrier signal and the other auxiliary carrier signal. In an other transmission mode, however, load modulation of the carrier signal can also be performed by means of two other, three other or four other auxiliary carrier signals. The use of one auxiliary carrier signal is advantageous, for example when disturbances occur in the range of the one auxiliary carrier signal but no disturbances occur in the range of the other auxiliary carrier signal, because load modulation of the carrier signal by means of the other auxiliary carrier signal then enables undisturbed and correct data transmission. The use of, for example two auxiliary carrier signals offers the advantage that, in the case of disturbances in the range of the one auxiliary carrier signal, it may be that no disturbances occur in the range of the other auxiliary carrier signal, so that data reception in the write/read station is then possible on the basis of the other auxiliary carrier signal. The use of two auxiliary carrier signals thus introduces a given redundancy which yields a high reliability. On the other hand, the use of two auxiliary carriers implies a comparatively high power consumption in a data carrier, so that its range is reduced. The use of only one auxiliary carrier signal for data transmission offers the advantage of a comparatively low power consumption in the data carrier; this is attractive with a view to achieving an as large as possible range. Due to the influencing of the data carrier by the write/read station, taking place upon detection of disturbances in the course of a data transmission from the data carrier to the write/read station, it is advantageously possible to activate each time a more attractive transmission mode or communication mode for a data carrier according to the invention.

It is to be noted that for the transmission of digital data, i.e. data blocks, from a data carrier to a write/read station it is already known from the patent document EP 0 845 751 A1 to subject a carrier signal which is generated in the write/read station and inductively obtained in the data carrier to load modulation by means of two auxiliary carrier signals, the ratio of the auxiliary carrier frequencies f1 and f2 of the auxiliary carrier signals to the carrier frequency f0 of the carrier signal each time being an integer number. A "1" bit is then transmitted by load modulation of the carrier signal by means of the auxiliary carrier signal having the frequency f1=484.2 kHz and a "0" bit is transmitted by load modulation of the carrier signal by means of the auxiliary carrier signal having the auxiliary carrier frequency f2=423.75 kHz. When disturbances occur in the data transmission from the data carrier to the write/read station, they are detected by the test means included in the write/read station, after which the test means generate control information upon detection of disturbances or errors in the received data. This control information is applied to sequencing means which output, in dependence on the supplied control information, switching signals which are used for switching purposes within the write/read station; via these switching operations it is attempted to achieve an improved or an essentially correct data transmission. In the data carrier system which is known from the patent document EP 0 845 751 A1, upon detection of disturbances or errors in the data transmission switching operations are carried out only in the write/read station. Such switching operations, however, cannot have an effect on disturbances whose origins lie in the transmission path from the data carrier to the write/read station, so that errors caused by such disturbances during the data transmission cannot be eliminated in this known data carrier system.

These and other aspects of the invention will become apparent from the embodiment described hereinafter.

The invention will be described in detail hereinafter with reference to the embodiment which is shown in the drawings, however, without the invention being restricted thereto.

The FIGS. 3A, 3B, 3C and 3D show waveforms of signals occurring in a first transmission mode in the data carrier of FIG. 2.

The FIGS. 4A, 4B, 4C and 4D show waveforms of signals occurring in a second transmission mode in the data carrier of FIG. 2.

Figure 1:
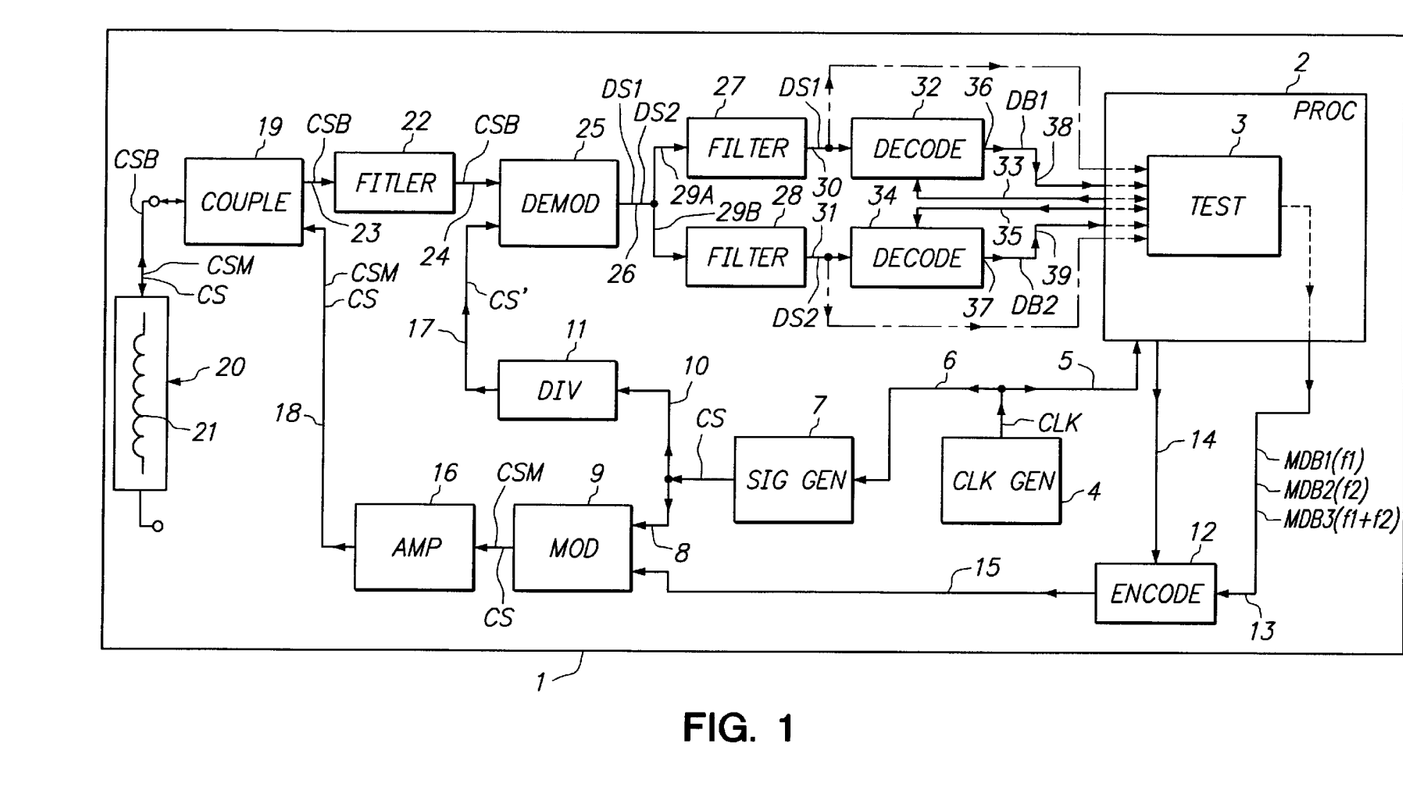
FIG. 1 shows a block diagram of an in this context essential part of a write/read station in an embodiment of the invention which is arranged for contactless reception of data from a data carrier as shown in FIG. 2.
Figure 2:
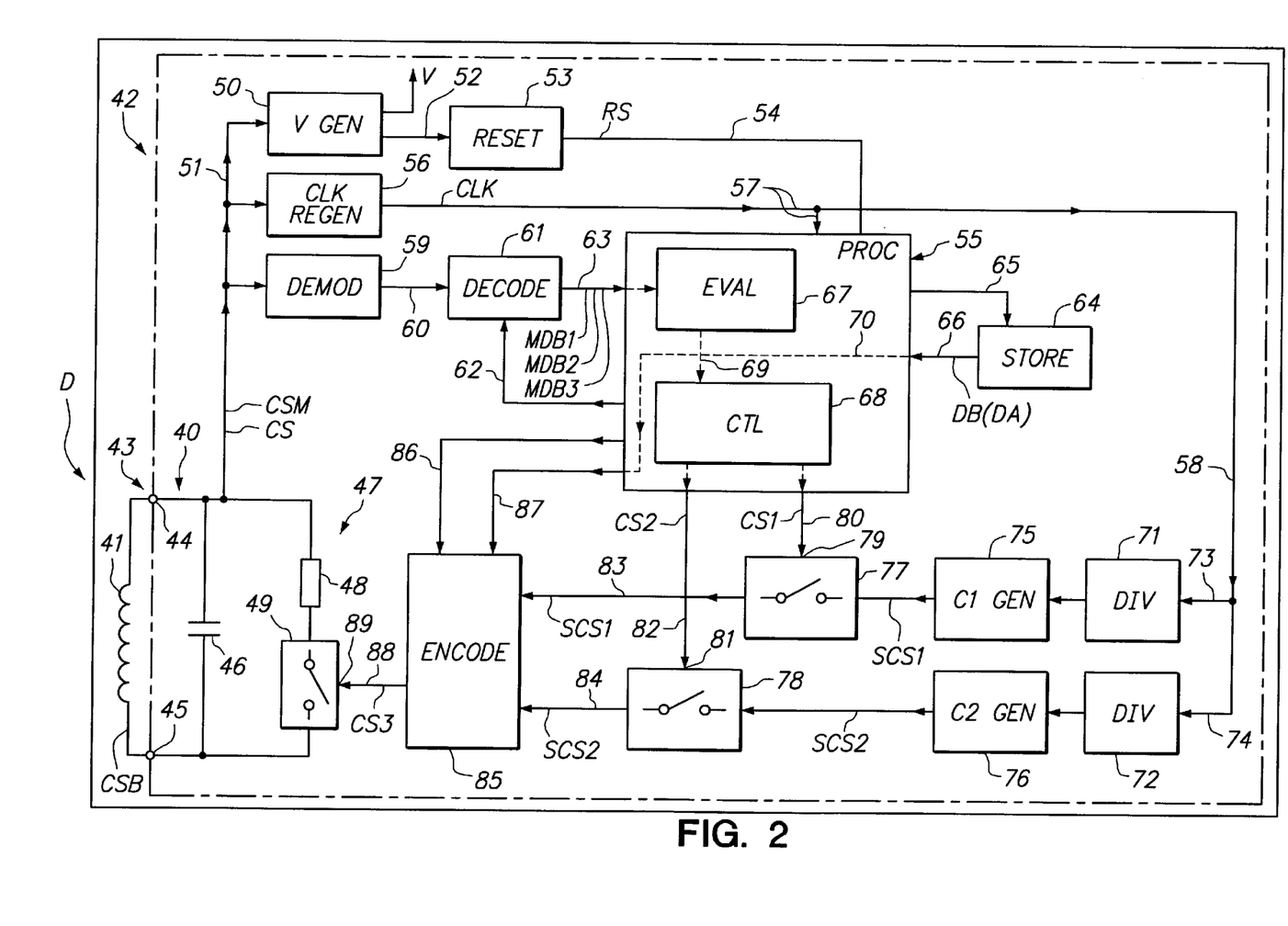
FIG. 2 shows a block diagram of an in this context essential part of a data carrier, and a circuit for this data carrier, in an embodiment of the invention which is arranged for contactless output of data to the write/read station shown in FIG. 1.

FIG. 1 shows a write/read station 1 which will be referred to hereinafter as the station 1 for the sake of brevity. The station 1 is intended and arranged to communicate with a plurality of data carriers D. FIG. 2 shows such a data carrier D.

As regards the communication between the station 1 and the data carriers D it is to be noted that such communication takes place mainly in the form of data blocks, each data block consisting of a predetermined number of bytes and each byte consisting of a predetermined number of bits, being 8 bits in the present case. In the course of the communication between the station 1 and the data carriers D the station 1 can transmit instruction data blocks to the data carriers D, for example a selection data block, a read data block, a write data block and a stop data block. In the present case only the transmission mode data blocks MDB from among the instruction data blocks will be elaborated upon in the following description.

The station 1 includes data processing means 2. The data processing means 2 include (not shown) sequencing means, logic means, control means and storage means. The data processing means 2 also include test means 3 whose function will be described in detail hereinafter.

The station 1 also includes a clock signal generator 4 which generates a clock signal CLK which has a frequency f0 amounting to 13.56 MHz. The clock signal CLK can be applied to the data processing means 2 via a connection 5.

The clock signal CLK which is generated by the clock signal generator 4 can also be applied, via a further connection 6, to a carrier signal generator 7 which generates a carrier signal CS in dependence on the clock signal CLK, said carrier signal also having a frequency f0 amounting to 13.56 MHz. The carrier signal CS which is generated by the carrier signal generator 7 can be applied, via a connection 8, to modulation means 9 and, via a further connection 10, to frequency division means 11.

The station 1 also includes encoding means 12 which can be supplied, via a connection 13, with the instruction data blocks generated by the data processing means 2. The previously mentioned transmission mode data blocks MDB can thus also be applied to the encoding means 12. The encoding means 12 can be controlled, via a connection 14, by the sequencing means included in the data processing means 2. The encoding means 12 provide the encoding of the instruction data blocks applied thereto, i.e. the encoding of the transmission mode data blocks MDB received. The data blocks encoded by means of the encoding means 12 can be applied to the modulation means 9 via a connection 15.

In the present case the modulation means 9 are formed by amplitude modulation means which can be supplied with the carrier signal CS from the carrier signal generator 7, via the connection 8, and ensure amplitude modulation of the carrier signal CS in dependence on the encoded data blocks output by the encoding means 12. The modulation means 9 are arranged to carry out a 10% amplitude modulation (ASK 10%) and output an amplitude modulated carrier signal CSM. The modulation means in the form of amplitude modulation means, however, may also be arranged to carry out a 100% amplitude modulation (ASK 100%).

In the case that the modulation means 9 are not supplied with encoded data blocks from the encoding means 12, the modulation means 9 output the non-modulated carrier signal CS. This is the case, for example if data is transmitted from the data carrier D to the station 1 during a communication operation between the station 1 and a data carrier D.

The amplitude modulated carrier signal CSM as well as the non-modulated carrier signal CS can be applied to a transmitter amplifier 16.

The carrier signal CS applied to the frequency division means 11 by the carrier signal generator 7, via the connection 10, is subjected to frequency division in the frequency division means 11. The frequency division means 11 can thus output a frequency-divided carrier signal CS' via a connection 17.

The transmitter amplifier 16 is connected, via a connection 18, to coil coupling means 19 via which either the amplitude modulated carrier signal CSM or the non-modulated carrier signal CS can be applied to transmitter/receiver means 20 which include a transmitter coil 21. The transmitter/receiver means 20, including their transmitter coil 21, constitute contactless operative transmitter means which can be coupled to contactless operative transmitter means of a respective data carrier D in a contactless manner, so that an amplitude modulated carrier signal CSM as well as a non-modulated carrier signal CS can be obtained in a data carrier D by means of the contactless operative transmitter means of the data carrier D; in one transmission mode load modulation of the non-modulated carrier signal CS can be performed by means of an auxiliary carrier signal in order to transmit a data block from the data carrier D to the station 1 as will be described in detail hereinafter.

The station 1 also includes input filter means 22 which are connected, via a connection 23, to the coil coupling means 19. A load modulated carrier signal CSB can be applied to the input filter means 22 via the connection 23. After the filtering of the load modulated carrier signal CSB by means of the input filter means 22, the filtered load modulated carrier signal CSB can be applied, via a connection 24, to demodulation means 25. The first demodulation means 25 can also be supplied with the frequency-divided carrier signal CS' via the connection 17. The load modulated carrier signal CSB can be demodulated by means of the demodulation means 25. The signals formed by demodulation can be output by the demodulation means 25 via a connection 26. The signals output by the demodulation means 25 may concern a data signal DS1 which contains a first auxiliary carrier signal SCS1 and is encoded according to a Manchester code, or a second data signal DS2 which contains a second auxiliary carrier signal SCS2 and is also encoded according to a Manchester code.

The station 1 also includes first filter means 27 and second filter means 28, both of which are connected, via a respective connection 29A and 29B, to the connection 26 and hence to the output of the demodulation means 25. The first filter means 27 are arranged to filter out the first data signal DS1 which contains the first auxiliary carrier signal SCS1 and is encoded according to a Manchester code. The second filter means 28 are arranged to filter out the second data signal DS2 which contains the second auxiliary carrier signal SCS2 and is also encoded according to a Manchester code. The first filter means 27 output the filtered out first data signal DS1 via a connection 30. The second filter means 28 output the filtered out second data signal DS2 via a further connection 31.

Decoding means 32 which are controllable via a connection 33 are connected to the connection 30. Second decoding means 34 which are controllable via a further connection 35 are connected to the connection 31. The two decoding means 32 and 34 are capable of decoding the data signals DS1 and DS2 applied thereto, so that the first decoding means 32 output, via their output 36, data which lies in the baseband and constitute a respective first data block DB1, and the second decoding means 34 output, via their output 37, data which lies in the baseband and constitutes a second data block DB2. The data blocks DB1 and DB2 output via the outputs 36 and 37 can be applied, via a respective connection 38 and 39, to the data processing means 2.

As has already been stated, the data processing means 2 include the test means 3 which can also be supplied, as diagrammatically denoted by dashed lines in FIG. 1, with the data blocks DB1 and DB2 output by the first decoding means 32 and the second decoding means 34. The construction of the test means 3 is such that they can execute a test so as to detect whether disturbances occur in the signal path subsequent to the demodulation means 25. Thus, they also detect disturbances which are due to disturbing effects in the transmission path between a data carrier D and the station 1.

In the station 1 shown in FIG. 1 the test means 3 can be supplied with the data blocks DB1 and DB2, output by the decoding means 32 and 34, in order to carry out a test. However, it is also readily possible to supply the test means 3 with the data signals DS1 and DS2 instead of the data blocks DB1 and DB2 (as denoted by dash-dot lines). It is also possible to supply the test means with the data blocks DB1 and DB2 as well as with the data signals DS1 and DS2.

The test means 3 are capable of generating different control information in dependence on the circumstances, i.e. in dependence on which transmission mode is activated and which disturbance is detected, the test means 3 being arranged to generate a plurality of transmission mode data blocks MDB1, MDB2 and MDB3. The test means 3 can supply each of these transmission mode data blocks MDB1, MDB2 and MDB3, as indicated by dashed lines in FIG. 1, via the connection 13 provided between the data processing means 2 and the encoding means 12. The transmission mode data blocks MDB can thus be applied to the encoding means 12 which provide encoding, after which the modulation means 9 provide modulation so that, after amplification of the modulated transmission mode data blocks MDB by means of the transmitter amplifier 16, each of the modulated transmission mode data blocks MDB can be transmitted to a data carrier D by means of the transmitter/receiver means 20. Each modulation mode data block MDB1, MDB2 and MDB3 is capable of activating a different transmission mode in a data carrier D connected so as to communicate with the station 1, as will be described in detail hereinafter.

The construction of the data carrier D, being suitable and constructed for cooperation with the station 1 shown in FIG. 1, will be described in detail hereinafter on the basis of the data carrier D shown in FIG. 2.

The data carrier D includes receiver/transmitter means 40 which include a transmitter coil 41 and are arranged to receive data blocks as well as to transmit data blocks.

The data carrier 2 includes an integrated circuit 42, of which FIG. 2 shows only the elements which are essential in the present context. The circuit 42 includes connection means 43 which include a first connection contact 44 and a second connection contact 45.

The transmitter coil 41 is connected to the two connection contacts 44 and 45 of the connection means 43. Furthermore, a capacitor 46 is connected to the two connection contacts 44 and 45; this capacitor constitutes, in conjunction with the transmitter coil 41, a parallel resonant circuit which constitutes essentially the receiver/transmitter means 40. The receiver/transmitter means 40 form contactless operative transmitter means which can be inductively coupled to the contactless operative transmitter means of the write/read station 1, so to the transmitter/receiver means 20 of the station 1; inductive coupling by means of the receiver/transmitter means 40 in the data carrier D then enables an amplitude modulated carrier signal CSM as well as a non-modulated carrier signal CS to be obtained in the data carrier D, both signals being generated in the station 1.

The data carrier D includes load modulation means 47 whereby, in a transmission mode for the transmission of a data block from the data carrier D to the station 1, load modulation of the non-modulated carrier signal CS can be carried out by means of an auxiliary carrier signal SCS, as will be described in detail hereinafter. The load modulation means 47 essentially consist of the series connection of a resistor 48 and a controllable switch 49. The series connection of the resistor 48 and the switch 49 is also connected to the two connection contacts 44 and 45, and hence connected parallel to the parallel resonant circuit consisting of the transmitter coil 41 and the capacitor 46. The controllable switch 49 can be switched between a non-conductive state and a conductive switching state, the resistor 48 does not represent a load for the parallel resonant circuit in the non-conductive state of the switch 49 whereas in the conductive switching state of the switch 49 the resistor 48 provides damping of the parallel resonant circuit. The control of the controllable switch 49 thus enables load modulation of the non-modulated carrier signal CS which is generated in the station 1 and transmitted to the data carrier D; such load modulation produces, because of the inductive coupling between the two transmitter coils 41 and 21, a load modulated carrier signal CSB in the data carrier D as well as in the station 1.

The data carrier D, or the circuit 42 of the data carrier D, also includes DC voltage generating means 50 which are connected, via a connection 51, to the first connection contact 44 and whereby, using the amplitude modulated carrier signal CSM or the non-modulated carrier signal CS, a DC supply voltage V can be generated so as to feed the entire circuit 42. It is to be noted that the DC voltage generating means 50 include voltage limiting means in order to prevent the occurrence of an excessively high DC supply voltage V in known manner.

To the DC voltage generating means 50 there are connected, via a connection 52, reset signal generating means 53 which can generate a reset signal RS upon occurrence of a DC supply voltage V; this is the case whenever the data carrier D enters the communication range of a station 1, said reset signal being capable of initiating a so-called power-on-reset. The reset signal RS can be applied, via a connection 54, to data processing means 55 whose construction and operation will be described in detail hereinafter.

The data carrier D also includes clock signal regenerating means 56 which are also connected, via the connection 51, to the first connection contact 44. The clock signal CLK can be regenerated from the received amplitude modulated carrier signal CSM, or from the received non-modulated carrier signal CS, by means of the clock signal regenerating means 56 so that the clock signal CLK is available in the data carrier D as well as in the station 1 generating and transmitting the relevant carrier signal CSM or CS. The regenerated clock signal CLK is applied to the data processing means 55 via a connection 57. The regenerated clock signal CLK is also available via a connection 58.

The data carrier D also includes demodulation means 59 which are formed as amplitude demodulation means and are also connected to the first connection contact 44 via the connection 51. The demodulation means 59 are capable of demodulating the amplitude modulated carrier signal CSM transmitted by a station 1 and received by the transmitter coil 41 of the data carrier D. The demodulation means 59 output, via a connection 60, the data blocks transmitted to the data carrier D, so also including the transmission mode data blocks MDB1, MDB2 and MDB3 transmitted to the data carrier D, in demodulated but not yet decoded form.

Decoding means 61 are provided for the decoding of encoded data blocks. The decoding means 61 can be controlled, via a connection 62, by sequencing means which are included in the data processing means 55 but are not shown in FIG. 2. The decoding means 61 provide the decoding of data blocks, so also the decoding of the transmission mode data blocks MDB1, MDB2 and MDB3; said decoded transmission mode data blocks can be applied to the data processing means 55 via a connection 63.

The data processing means 55 include (not shown) sequencing means, logic means, control means and also storage control means. The storage control means (not shown) are capable of controlling storage means 64 of the data carrier D, via a connection 65, in such a manner that data DA which is stored in the storage means 64 and constitutes each time at least one data block DB, can be applied, via a connection 66, to the data processing means 55.

The data processing means 55 form evaluation means 67 whereby each transmission mode data block MDB1, MDB2 or MDB3 transmitted to the data carrier D, or to the circuit 42, by the station 1 can be evaluated.

The data processing means 55 also implement control means 68 which can be influenced by the evaluation means 67, as denoted by a dotted connection 69. The control means 68 can control the data carrier 2, or the circuit 42, to an other transmission mode in conformity with an evaluated transmission mode data block MDB1, MDB2 or MDB3, each transmission mode corresponding to a transmission mode data block MDB1, MDB2 or MDB3.

The data carrier D, or the circuit 42, also includes first frequency division means 71 and second frequency division means 72 which are connected, via a respective connection 73 and 74, to the connection 58. The first frequency division means have a division ratio 1:32 and the second frequency division means have a division ratio 1:28. The first frequency division means 71 are succeeded by a first auxiliary carrier signal generator 75. The second frequency division means 72 are succeeded by a second auxiliary carrier signal generator 76. Using the frequency-divided clock signal output by the first frequency division means 71, the first auxiliary carrier signal generator 75 is capable of generating a first auxiliary carrier signal SCS1 which has a frequency f1=423.75 kHz. Using the frequency-divided clock signal output by the second frequency division means 72, the second auxiliary carrier signal generator 76 is capable of generating a second auxiliary carrier signal SCS2 which has a frequency f2=484.28 kHz.

The first auxiliary carrier signal generator 75 is succeeded by first controllable switching means 77 and the second auxiliary carrier signal generator 76 is succeeded by second controllable switching means 78. The first switching means 77 include a control input 79 which is connected, via a connection 80, to the data processing means 55 or to the control means 68 implemented by the data processing means 55. The second switching means 78 include a control input 81 which is also connected, via a connection 82, to the data processing means 55 or to the control means 68 implemented by the data processing means 55. The forwarding of the two auxiliary carrier signals SCS1 and SCS2 can be controlled by means of the two switching means 77 and 78 in dependence on control signals CS1 and CS2 which can be applied to the switching means 77 and 78 by the control means 68. This will be described in detail hereinafter.

At their output side the first switching means 77 are connected, via a connection 83, to encoding means 85 of the data carrier D or the circuit 42, and at their output side the second switching means 78 are connected thereto via a connection 84. Via a connection 86, the encoding means 85 can be controlled by the sequencing means (not shown) which are included in the data processing means 55. The encoding means 85 can also be supplied, via a further connection 87 and (as denoted by a dotted connection 70 in FIG. 2) also via the connection 66, with the data DA or data blocks DB applied to the data processing means 55 from the storage means 64. In the present case the encoding means 85 are arranged to carry out a so-called Manchester encoding operation. At their output side the encoding means 85 are connected, via a connection 88, to a control input 89 of the controllable switch 49 of the load modulation means 47. The switching state of the switch 49 can thus be controlled in dependence on the Manchester-encoded signal supplied via the connection 88.

The co-operation between the station 1 and the data carrier D, i.e. a communication operation between the station 1 and the data carrier D, will be described in detail hereinafter. In the course of such a communication operation, contactless transmission of data from the data carrier D to the station 1 also takes place.

It is assumed that the data carrier D enters the communication range of the station 1. Subsequently, the station 1 then outputs, for example automatically at regular time intervals, a selection data block so as to request data carriers D present within the communication range of the station 1 to return an identification data block in order to enable selection of all data carriers D present within the communication range. The data carrier D shown in FIG. 2 is also selected in the course of such a selection operation.

It is also assumed that for such a selection of the data carrier D the data processing means 2 of the station 1 generate the first transmission mode data block MDB1 and output it to the encoding means 12 in the framework of the selection data block so that, after the encoding, modulation of the carrier signal CS takes place in the modulation means 9, again in dependence on the first transmission mode data block MDB1, after which the modulated carrier signal CSM is transmitted by means of the transmitter/receiver means 20. As a result, the modulated carrier signal CSM is received by the receiver/transmitter means 40 of the data carrier D, after which demodulation is performed by means of the demodulation means 59 and subsequently decoding by means of the decoding means 61 so that, subsequent to the decoding, the first transmission mode data block MDB1 is also applied to the data processing means 55 of the data carrier D. Using the evaluation means 67 in the data processing means 55, the first transmission mode data block MDB1 is evaluated. In dependence on the evaluation of the first transmission mode data block MDB1 to the data carrier D applied by the station 1, a first transmission mode is activated in the data carrier D. This first transmission mode is also activated in the station 1, that is to say by means of the first transmission mode data block MDB1 already present in the station 1. The first transmission mode is thus activated in the station 1 as well as in the data carrier D, that is to say by means of the first transmission mode data block MDB1.

For the first transmission mode it is assumed that load modulation of the non-modulated carrier signal CS is performed by means of the first auxiliary carrier signal SCS1 in order to transmit a data block from the data carrier D to the station 1. In order to enable such a transmission of a data block from the data carrier D to the station 1 by load modulation of the non-modulated carrier signal CS, the station 1 transmits a carrier signal CS, generated by means of the carrier signal generator 7 but not modulated by the modulation means 9, so a non-modulated carrier signal CS, via the transmitter/receiver means 20 of the station 1, to the receiver/transmitter means 40 of the data carrier D, so that the non-modulated carrier signal CS becomes available for the purpose of load modulation in the carrier D. The load modulation can be carried out in known manner, using the load modulation means 47, by applying a control signal CS3 to the controllable switch 49 via the connection 87.

Figure 3A:
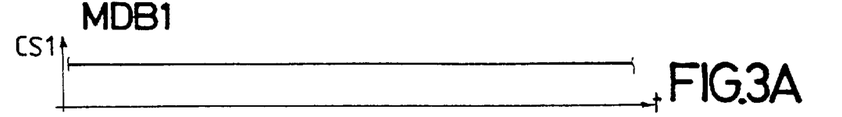
Figure 3B:
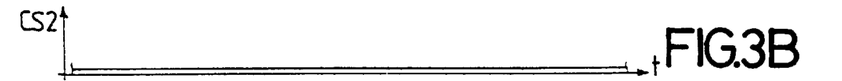
Figure 3C:
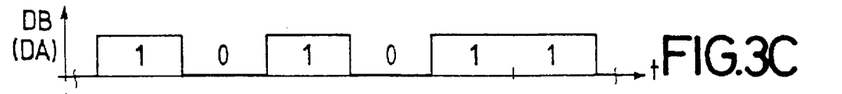
Figure 3D:
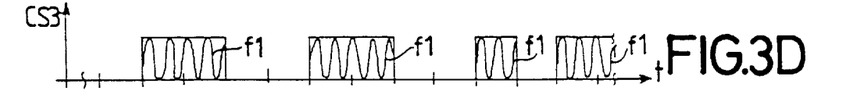

The generating of the control signal CS3 will be briefly described hereinafter with reference to the FIGS. 3A, 3B, 3C and 3D. After evaluation of the first transmission mode data block MDB1 by means of the evaluation means 67, these means apply, via the connection 69, control information to the control means 68 such that the control means 68 output the first control signal CS1 of FIG. 3A, formed by a high level, and that the control means 68 output the second control signal CS2 of FIG. 3B which is formed by a low level. The control signal CS1 sets the first switching means 77 to their conductive switching state whereas, because of the second control signal CS2, the second switching means 78 remain in their non-conductive switching state. It is thus achieved that the encoding means 85 receive only the first auxiliary carrier signal CS1 for Manchester encoding. It is assumed that the encoding means 85 receive the data block DB (only partly shown in FIG. 3C) via the connection 87, which data block consists of "0" bits and "1" bits. As a result of the bit sequence shown in FIG. 3C, the control signal CS3 shown in FIG. 3D is obtained via the Manchester encoding by means of the encoding means 85. In the control signal CS3 the first auxiliary carrier signal SCS1, having the frequency f1, occurs for each half bit, that is to say each time during the second half bit when a "1" bit is encoded, and each time during the first half bit when a "0" bit is encoded.

As soon as a cycle of the first auxiliary carrier signal SCS1 occurs in the control signal CS3, the controllable switch 49 is controlled with the frequency f1 of the first auxiliary carrier signal SCS1, so with the frequency f1=423.75 kHz; as a result, the non-modulated carrier signal CS is load modulated by means of the first auxiliary carrier signal SCS1, so that, because of the inductive coupling between the transmitter coil 41 of the data carrier D and the transmitter coil 21 of the station 1, a load-modulated carrier signal CSB is obtained, that is to say in the data carrier D as well as in the station 1.

Subsequently, the load-modulated carrier signal CSB is applied, via the input filter means 22, to the demodulation means 25 and demodulated by means of the demodulation means 25, so that at the output side the first data signal DS1, containing the first auxiliary carrier signal SCS1 and being encoded in conformity with a Manchester code, is obtained via the connection 26. The first data signal DS1 is filtered out by means of the first filter means 27 so as to be applied to the first decoding means 32. The first decoding means provide decoding of the Manchester encoded first data signal DS1 so that they output, via their output 36, a decoded first data block DB1 which is applied to the data processing means 2 of the station 1.

A second transmission mode can also be activated by means of the data processing means 2 of the station 1. To this end, the data processing means generate the second transmission mode data block MDB2 which is also applied to the data carrier D and evaluated by means of the evaluation means 67 of the data processing means 55 in the data carrier D. In conformity with the evaluation of the second transmission mode data block MDB2 transmitted to the data carrier D by the station 1, a second transmission mode is activated in the data carrier D. This second transmission mode is also activated in the station 1, that is to say by means of the second transmission mode data block MDB2 already present in the station 1. The second transmission mode is thus activated in the station 1 as well as in the data carrier D, that is to say by means of the second transmission mode data block MDB2.

For the second transmission mode it is assumed that load modulation of the non-modulated carrier signal CS is performed by means of the second auxiliary carrier signal SCS2 in order to transmit a data block from the data carrier D to the station 1. To this end, a control signal CS3 is generated again, as will be briefly described hereinafter with reference to the FIGS. 4A, 4B, 4C and 4D.

Figure 4A:
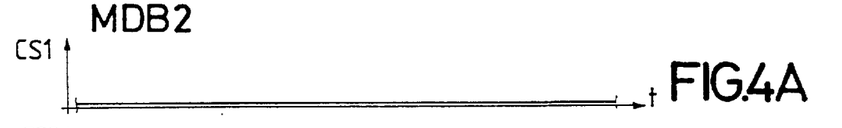
Figure 4B:
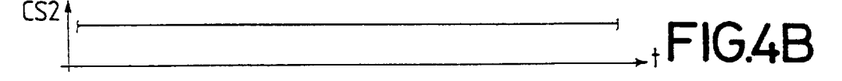
Figure 4C:
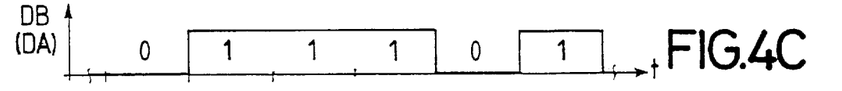

After evaluation of the second transmission mode data block MDB2 by means of the evaluation means 67, these means supply the control means 68, via the connection 69, with control information such that the control means 68 output the first control signal CS1 which is shown in FIG. 4A and is formed by a low level, and that the control means 68 output the second control signal CS2 which is shown in FIG. 4B and is formed by a high level. The first control signal CS1 leave the first switching means 77 in their non-conductive switching state whereas, due to the second control signal CS2, the second switching means 78 are set to their conductive switching state. It is thus achieved that the encoding means 85 for the Manchester encoding receive only the second auxiliary carrier signal SCS2. It is assumed that the data block DB, which is only partly shown in FIG. 4C and consists of "0" bits and "1" bits, is applied, via the connection 87, to the encoding means 85. Data block. Because of the bit sequence shown in FIG. 4C, the control signal CS3 shown in FIG. 3D is obtained by the Manchester encoding by means of the encoding means 85. In the control signal CS3 the second auxiliary carrier signal SCS2 of frequency f2 occurs for each half bit, that is to say each time during the second half bit when a "1" bit is encoded and each time during the first half bit when a "0" bit is encoded.

Figure 4D:
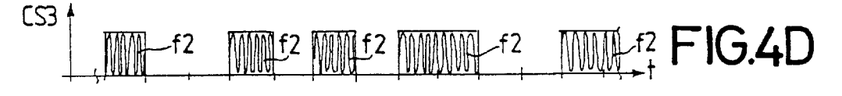

As soon as an oscillation train of the second auxiliary carrier signal SCS2 occurs in the control signal CS3, the controllable switch 49 is controlled at the frequency f2 of the second auxiliary carrier signal SCS2, so at the frequency f2=484.28 kHz, with the result that the non-modulated carrier signal CS is load modulated by means of the second auxiliary carrier signal SCS2, so that a load-modulated carrier signal CSB is obtained in the data carrier D as well as in the station 1.

Subsequently, the load-modulated carrier signal CSB is applied, via the input filter means 22, to the demodulation means 25 and demodulated by means of the demodulation means 25, so that at the output side the second data signal DS2 which contains the second auxiliary carrier signal SCS2 and is encoded in conformity with a Manchester code is obtained on the connection 26. The second data signal DS2 is filtered out by means of the second filter means 28 and applied to the second decoding means 34. The second decoding means provide decoding of the Manchester encoded second data signal DS2 so that they output, via their output 37, a decoded second data block DB2 which is applied to the data processing means 2 of the station 1.

The data processing means 2 of the station 1 can also generate a third transmission mode data block MDB3 whereby a third transmission mode can be activated in the station 1 as well as in the data carrier D. For the third transmission mode it is defined that load modulation of the non-modulated carrier signal CS is performed by means of the first auxiliary carrier signal CS1 as well as by means of the second auxiliary carrier signal CS2 in order to transmit a data block from the data carrier D to the station 1. In order to enable such a transmission of a data block from the data carrier D to the station 1 by means of the previously described load modulation, subsequent to the evaluation of the third transmission mode data block MDB3 by means of the evaluation means 67 the data processing means 55 of the data carrier D generate a control signal CS3 in the same manner as described before.

The generating of the control signal CS3 will be briefly described hereinafter with reference to the FIGS. 5A, 5B, 5C and 5D. After evaluation of the third transmission mode data block MDB3 by means of the evaluation means 67, these means supply, via the connection 69, the control means 68 with control information such that the control means 68 output the control signals CS1 and CS2 which are shown in the FIGS. 5A and 5B and are formed by a respective high level. The two control signals CS1 and CS2 control the first switching means 77 as well as the second switching means 78 to their conductive state. It is thus achieved that the encoding means 85 receive the first auxiliary carrier signal SCS1 as well as the second auxiliary carrier signal SCS2 for Manchester encoding. It is assumed that the data block DB, being only partly shown in FIG. SC, is applied to the encoding means 85 via the connection 87. Because of the bit sequence shown in FIG. SC, the Manchester encoding by means of the encoding means 85 produces the control signal CS3 shown in FIG. 5D. In the control signal CS3 the first auxiliary carrier signal SCS1, having the frequency f1, occurs each time for one half bit and the second auxiliary carrier signal SCS2, having the frequency f2, also occurs each time for one half bit. When a "0" bit is encoded, the first auxiliary carrier signal SCS1 of the frequency f1 occurs each time during the first half bit and each time during the second half bit the second auxiliary carrier signal SCS2 of the frequency f2 occurs. When a "1" bit is encoded, each time during the first half bit the second auxiliary carrier signal SCS2 occurs with the frequency f2 and each time during the second half bit the first auxiliary carrier signal SCS1 occurs with the frequency f1.

Figure 5A:
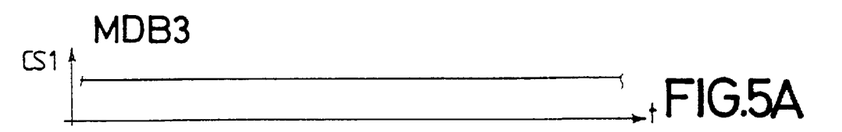
FIGS. 5A, 5B, 5C and 5D show waveforms of signals occurring in a third transmission mode in the data carrier of FIG. 2.
Figure 5B:
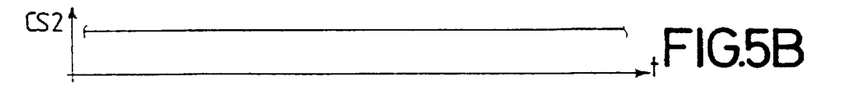
Figure 5C:
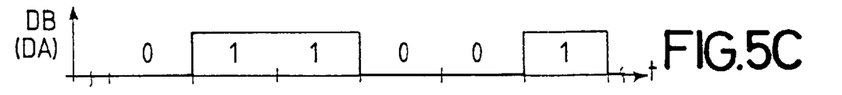
Figure 5D:
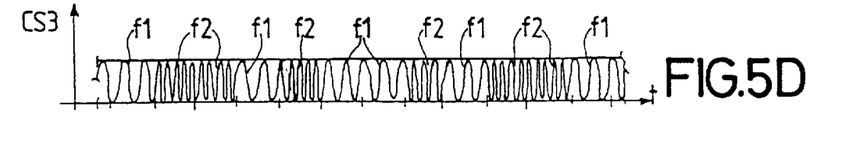

As soon as the control signal CS3 shown in FIG. SD is applied to the controllable switch 49, the controllable switch 49 is controlled with the frequency f1 of the first auxiliary carrier signal SCS1, so with the frequency f1=423.75 kHz, as well as with the frequency f2 of the second auxiliary carrier signal SCS2, so with the frequency f2=484.28 kHz. Consequently, the non-modulated carrier signal CS is load-modulated by means of the first auxiliary carrier signal CS1 as well as by means of the second auxiliary carrier signal SCS2, so that a load-modulated carrier signal CSB is obtained in the data carrier D as well as in the station 1.

Subsequently, the load-modulated carrier signal CSB is applied, via the input filter means 22, to the demodulation means 25 of the station 1 so as to be demodulated by means of the demodulation means 25 so that at the output side, on the connection 26, there are obtained a first data signal DS1 which contains the first auxiliary carrier signal SCS1 and is encoded in conformity with a Manchester code as well as a second data signal DS2 which contains the second auxiliary carrier signal SCS2 and is encoded in conformity with a Manchester code. The two data signals DS1 and DS2 are filtered out by means of the first filter means 27 and the second filter means 28 and are applied to the first decoding means 32 and the second decoding means 34, respectively. The decoding means 32 and 34 provide decoding of the Manchester encoded data signals DS1 and DS2 so that a respective decoded data block DB1 and DB2 is output via their outputs 36 and 37 in order to be applied to the data processing means of the station 1.

The data processing means 2 in the station 1 include the test means 3. The test means 3 can be supplied with the decoded data blocks DB1 and DB2 output by the first decoding means 32 and the second decoding means 34. The test means 3 test the data blocks DB1 and DB2. The test means 3 can carry out a test whether or not disturbances occur in the signal path beyond the demodulation means 25; in case such disturbances are detected, the test means 3 can generate control information, that is to say one of the previously described transmission mode data blocks MDB1, MDB2 and MDB3.

The test means 3 are arranged to carry out a test as to whether the disturbances detected thereby are due to an error occurring during the load modulation of the carrier signal CS by means of the one auxiliary carrier signal SCS1. In the case of a positive test result, the test means 3 are arranged to generate a transmission mode data block associated with this test result, which data block may be formed by the second transmission mode data block MDB2 or also by the third transmission mode data block MDB3. It is thus achieved that, in case disturbances occur in the transmission from the data carrier D to the station 1 during a first transmission mode which is customarily activated in the station 1 and in the data carrier 2, another transmission mode is automatically activated in the data carrier 2 as well as in the station 1, that is to say either the second transmission mode or the third transmission mode; the foregoing is realized by means of the second transmission mode data block MDB2 or the third transmission mode data block MDB3 which is generated by the test means 3 and provides activation of the relevant transmission mode in the station 1 as well as in the data carrier D.

With respect to the test means 3 it is to be noted that the test means may also be arranged to carry out a test as to whether an interference signal imitating a useful signal is present beyond the demodulation means 25 during a transmission pause in which no load modulation of the carrier signal CS is performed by means of the one auxiliary carrier signal SCS1 in the data carrier 2; in the case of a positive test result, the test means 3 may then be arranged to generate a transmission mode data block MDB2 or MDB3 associated with this test result.

In the described station 1 and in the described data carrier D it is simply achieved, using only very few additional means, that the data carrier D can be influenced by the station 1 after detection of an error in the data transmission from the data carrier D to the station 1, that is to say in such a manner that instead of data transmission by load modulation by means of one auxiliary carrier signal a change over takes place to data transmission by load modulation of a carrier signal by means of at least one other auxiliary carrier signal. Thus, upon detection of disturbances in the course of a data transmission from the data carrier D to the station 1, carried out in a given transmission mode, advantageously a change over takes place to a respective more advantageous transmission method or communication method with a different transmission mode.

The invention is not restricted to the described embodiment. Other transmission modes are also feasible and activatable by means of further transmission mode data blocks. For example, in the case of a further transmission mode the transmission of each time one bit can be realized by means of three auxiliary carrier signals or also by means of four auxiliary carrier signals. Regarding the data carrier D described with reference to FIG. 2 it is also to be noted that the first switching means 77 and the second switching means 78 may also be included in the encoding means 85. Furthermore, the first switching means 77 and the first auxiliary carrier signal generator 75 may also be combined, like the second switching means 78 and the second auxiliary carrier signal generator 76.

What is claimed is:

1. A method for the contactless transmission of data (DA) from a data carrier (D) to a write/read station (1), wherein
   the write/read station (1) generates a carrier signal (CS) and the generated carrier signal (CS) is applied to contactless operative transmitter means (20) of the write/read station (1), wherein a carrier signal (CS) is obtained in the data carrier (D) by means of contactless operative transmitter means (40) of the data carrier (D) which are coupled to the transmitter means (20) of the write/read station (1) in a contactless manner, wherein load modulation of the carrier signal (CS) is performed by means of one auxiliary carrier signal (SCS1) in a transmission mode for the transmission of a data block (DB) from the data carrier (D) to the write/read station (1),
   wherein the carrier signal (CSE) load modulated by means of the one auxiliary carrier signal (SCS1) is demodulated by means of demodulation means (25) in the write/read station in order to obtain the transmitted data block (DB),
   wherein a test is performed in the write/read station (1) in order to determine whether disturbances occur in the signal path beyond the demodulation means (25), and
   wherein control information is generated upon detection of disturbances, characterized in that
      at least one transmission mode data block (MDB1, MDB2, MDB3) is generated as control information,
      that the transmission mode data block (MDB1, MDB2, MDB3) is transmitted to the data carrier (D),
      that the transmitted transmission mode data block (MDB1, MDB2, MDB3) is evaluated in the data carrier (D),
      that, in conformity with the evaluation of the transmitted transmission mode data block (MDB1, MDB2, MDB3), the data carrier (D) is controlled to an other transmission mode in which, in order to transmit a data block (DB) from the data carrier (D) to the write/read station (1), load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values,
      that, during the testing as to whether disturbances occur in the signal path beyond the demodulation means (25), a test is performed so as to determine whether the disturbances are due to an error occurring during the load modulation of the carrier signal (CS) by means of the one auxiliary carrier signal (SCS1), and
      that, in the case of a positive result of this test, a transmission mode data block (MDB2, MDB3) associated with this test result is generated, transmitted to the data carrier (D) and evaluated in the data carrier (D).

2. A method as claimed in claim 1, characterized in that, in conformity with the evaluation of the transmitted transmission mode data block (MDB2), the data carrier (D) is controlled to an other transmission mode in which, in order to transmit a data block (DB) from the data carrier (D) to the write/read station (1), load modulation of the carrier signal (CS) is performed by means of only the other auxiliary carrier signal (SCS2).

3. A method as claimed in claim 1, characterized in that, in conformity with the evaluation of the transmitted transmission mode data block (MDB3), the data carrier (D) is controlled to an other transmission mode in which, in order to transmit a data block (DB) from the data carrier (D) to the write/read station (1), load modulation of the carrier signal (CS) is performed by means of the one auxiliary carrier signal (SCS1) and the other auxiliary carrier signal (SCS2).

4. A method for the contactless transmission of data (DA) from a data carrier (D) to a write/read station (1), wherein
   the write/read station (1) generates a carrier signal (CS) and the generated carrier signal (CS) is applied to contactless operative transmitter means (20) of the write/read station (1), wherein a carrier signal (CS) is obtained in the data carrier (D) by means of contactless operative transmitter means (40) of the data carrier (D) which are coupled to the transmitter means (20) of the write/read station (1) in a contactless manner, wherein load modulation of the carrier signal (CS) is performed by means of one auxiliary carrier signal (SCS1) in a transmission mode for the transmission of a data block (DB) from the data carrier (D) to the write/read station (1),
   wherein the carrier signal (CSE) load modulated by means of the one auxiliary carrier signal (SCS1) is demodulated by means of demodulation means (25) in the write/read station in order to obtain the transmitted data block (DB),
   wherein a test is performed in the write/read station (1) in order to determine whether disturbances occur in the signal path beyond the demodulation means (25), and
   wherein control information is generated upon detection of disturbances, characterized in that
      at least one transmission mode data block (MDB1, MDB2, MDB3) is generated as control information,
      that the transmission mode data block (MDB1, MDB2, MDB3) is transmitted to the data carrier (D), that the transmitted transmission mode data block (MDB1, MDB2, MDB3) is evaluated in the data carrier (D), that, in conformity with the evaluation of the transmitted transmission mode data block (MDB1, MDB2, MDB3), the data carrier (D) is controlled to an other transmission mode in which, in order to transmit a data block (DB) from the data carrier (D) to the write/read station (1), load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values, that, during the testing as to whether disturbances occur in the signal path beyond the demodulation means (25), a test is performed so as to determine whether an interference signal imitating a useful signal is present beyond the demodulation means (25) during a transmission pause in which no load modulation of the carrier signal (CS) is performed by means of the one auxiliary carrier signal (SCS1) in the data carrier (D), and that, in the case of a positive result of this test, a transmission mode data block (MDB2, MDB3) associated with this test result is generated, transmitted to the data carrier (D) and evaluated in the data carrier (D).

5. A write/read station (1) for the contactless reception of data from a data carrier (D), which station includes carrier signal generating means (7) for generating a carrier signal (CS), and contactless operative transmitter means (20) which is supplied with the carrier signal (CS) and is coupled to contactless operative transmitter means (40) of the data carrier (D) in a contactless manner so that a carrier signal (CS) is obtained in the data carrier (D) by means of the transmitter means (40) of the data carrier (D), in which load modulation of the carrier signal (CS) is performed by means of one auxiliary carrier signal (SCS1) in a transmission mode for the transmission of a data block (DB) from the data carrier (D) to the write/read station (1), includes demodulation means (25) for demodulating the carrier signal (CSB) load modulated by means of the one auxiliary carrier signal, which demodulation means outputs a data block (DB1) transmitted from the data carrier (D) to the write/read means (1), and includes test means (3) which are arranged to test whether disturbances occur in the signal path beyond the demodulation means (25), and to generate control information upon detection of disturbances, characterized in that the test means (3) are arranged to generate at least one transmission mode data block (MDB1, MDB2, MDB3) as control information whereby in the data carrier (D) an other transmission mode is activated in which load modulation of the carrier signal (CS) is performed by means of at least one other auxiliary carrier signal (SCS2) in order to transmit a data block (DB) from the data carrier (D) to the write/read station (1), the at least one frequency (f2) of the at least one other auxiliary carrier signal (SCS2) and the frequency (f1) of the one auxiliary carrier signal (SCS1) having different values, that the test means (3) are arranged to carry out a test as to whether the disturbances are due to an error occurring; during the load modulation of the carrier signal (CS) by means of the one auxiliary carrier signal (SCS1), and that the test means (3) are arranged to generate, in the case of a positive result of this test, a transmission mode data block (MDB2, MDB3) associated with this test result.

6. A write/read station (1) as claimed in claim 5, characterized in that the test means (3) are arranged to generate at least one transmission mode data block (MDB2) whereby in the data carrier (D) an other transmission mode is activated in which load modulation of the carrier signal (CS) is performed by means of only the other auxiliary carrier signal (SCS2) in order to transmit a data block (DB) from the data carrier (D) to the write/read station (1).

7. A write/read station (1) as claimed in claim 5, characterized in that the test means (3) are arranged to generate at least one transmission mode data block (MDB3) whereby in the data carrier (D) an other transmission mode is activated in which load modulation of the carrier signal (CS) is performed by means of the one auxiliary carrier signal (SCS1) and the other auxiliary carrier signal (SCS2) in order to transmit a data block (DB) from the data carrier (D) to the write/read station (1).

8. A write/read station (1) for the contactless reception of data from a data carrier (D), which station includes carrier signal generating means (7) for generating a carrier signal (CS), and contactless operative transmitter means (20) which is supplied with the carrier signal (CS) and is coupled to contactless operative transmitter means (40) of the data carrier (D) in a contactless manner so that a carrier signal (CS) is obtained in the data carrier (D) by means of the transmitter means (40) of the data carrier (D), in which load modulation of the carrier signal (CS) is performed by means of one auxiliary carrier signal (SCS1) in a transmission mode for the transmission of a data block (DB) from the data carrier (D) to the write/read station (1), includes demodulation means (25) for demodulating the carrier signal (CSB) load modulated by means of the one auxiliary carrier signal, which demodulation means outputs a data block (DB1) transmitted from the data carrier (D) to the write/read means (1), and includes test means (3) which are arranged to test whether disturbances occur in the signal path beyond the demodulation means (25), and to generate control information upon detection of disturbances, characterized in that the test means (3) are arranged to generate at least one transmission mode data block (MDB1, MDB2, MDB3) as control information whereby in the data carrier (D) an other transmission mode is activated in which load modulation of the carrier signal (CS) is performed by means of at least one other auxiliary carrier signal (SCS2) in order to transmit a data block (DB) from the data carrier (D) to the write/read station (1), the at least one frequency (f2) of the at least one other auxiliary carrier signal (SCS2) and the frequency (f1) of the one auxiliary carrier signal (SCS1) having different values that the test means (3) are arranged to carry out a test as to whether an interference signal imitating a useful signal is present beyond the demodulation means (25) during a transmission pause in which no load modulation of the carrier signal (CS) is performed by means of the one auxiliary carrier signal (SCS1) in the data carrier (D), and that the test means (3) are arranged to generate, in the case of a positive result of this test, a transmission mode data block (MDB2, MDB3) associated with this test result.

9. A data carrier (D) for the contactless output of data (DA) to a write/read station (1), which data carrier includes:
contactless operative transmitter means (40) to couple to contactless operative transmitter means (20) of the write/read station (1), where a carrier signal (CS) generated in the write/read station (1) is obtained in the data carrier (D) in the coupled state and also includes load modulation means (47) whereby the carrier signal (CS) is load modulated by means of one auxiliary carrier signal (SCS1) in a transmission mode for the transmission of a data block (DB) from the data carrier (D) to the write/read station (1), characterized in that
the data carrier (D) includes evaluation means (67) for evaluating a transmission mode data block (MDB1, MDB2, MDB3) which is transmitted to the data carrier (D) by the write/read station (i) and controls the data carrier (D) to an other transmission mode in which load modulation of the carrier signal (CS) by means of at least one other auxiliary carrier signal (SCS2) is performed in order to transmit a data block (DB) from the data carrier (D) to the write/read station (1),
that the data carrier (D) includes control means (68) which are influenced by the evaluation means (67) and whereby the data carrier (D) is controlled, in conformity with an evaluated transmission mode data block (MDB1, MDB2, MDB3), to an other transmission mode in which, in order to transmit a data block (DB) from the data carrier (D) to the write/read station (1), load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values
that the evaluation means (67) are arranged to evaluate a transmission mode data block (MDB2, MDB3) which is transmitted to the data carrier (D) by a write/read station (1) if disturbances are detected in the write/read station (1) in the signal path beyond the demodulation means (25), on the basis of an error occurring during the load modulation of the, carrier signal (CS) by means of the one auxiliary carrier signal (SCS1), and
that the data carrier (D) is controlled to an other transmission mode in conformity with the evaluation of this transmission mode data block (MDB2, MDB3).

10. A data carrier (D) as claimed in claim 9, characterized in that
the data carrier (D) includes evaluation means (67) whereby a transmission mode data block (MDE2) transmitted to the data carrier (D) by the write/read station (1) is evaluated, which transmission mode data block controls the data carrier (D) to an other transmission mode in which, in order to transmit a data block (DB) from the data carrier (D) to the write/read station (1), load modulation of the carrier signal (CS) is performed only by means of the other auxiliary carrier signal (SCS2), and
that the data carrier (D) includes control means (68) which are influenced by the evaluation means (67) and whereby the data carrier (D) is controlled, in conformity with an evaluated transmission mode data block (MDB2), to an other transmission mode in which, in order to transmit a data block (DB) from the data carrier (D) to the write/read station (1), load modulation of the carrier signal (CS) is performed only by means of the other auxiliary carrier signal (SCS2).

11. A data carrier (D) as claimed in claim 9, characterized in that
the data carrier (D) includes evaluation means (67) whereby a transmission mode data block (MDB3) transmitted to the data carrier (D) by the write/read station (1) is evaluated and controls the data carrier (D) to an other transmission mode in which, in order to transmit a data block (DB) from the data carrier (D) to the write/read station (1), load modulation of the carrier signal (CS) is performed by means of the one auxiliary carrier signal (SCS1) and the other auxiliary carrier signal (SCS2), and
that the data carrier (D) includes control means (68) which are influenced by the evaluation means (67) and whereby the data carrier is controlled, in conformity with an evaluated transmission mode data block (MDB3), to another transmission mode in which, in order to transmit a data block (DB) from the data carrier (D) to the write/read station (1), load modulation of the carrier signal (CS) is performed by means of the one auxiliary, carrier signal (SCS1) and the other auxiliary carrier signal (SCS2).

12. A data carrier (D) for the contactless output of data (DA) to a write/read station (1), which data carrier includes:
contactless operative transmitter means (40) to couple to contactless operative transmitter means (20) of the write/read station (1), where a carrier signal (CS) generated in the write/read station (1) is obtained in the data carrier (D) in the coupled state and also includes load modulation means (47) whereby the carrier signal (CS) is load modulated by means of one auxiliary carrier signal (SCS1) in a transmission mode for the transmission of a data block (DB) from the data carrier (D) to the write/read station (1), characterized in that
the data carrier (D) includes evaluation means (67) for evaluating a transmission mode data block (MDB1, MDB2, MDB3) which is transmitted to the data carrier (D) by the write/read station (1) and controls the data carrier (D) to an other transmission mode in which load modulation of the carrier signal (CS) by means of at least one other auxiliary carrier signal (SCS2) is performed in order to transmit a data block (DB) from the data carrier (D) to the write/read station (1),
that the data carrier (D) includes control means (68) which are influenced by the evaluation means (67) and whereby the data carrier (D) is controlled, in conformity with an evaluated transmission mode data block (MDB1, MDB2, MDB3), to an other transmission mode in which, in order to transmit a data block (DB) from the data carrier (D) to the write/read station (1), load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values
that the evaluation means (67) are arranged to evaluate a transmission mode data block (MDB2, MDB3)

which is transmitted to the data carrier (D) by a write/read station (1) if an interference signal imitating a useful signal is detected in the-write/read station (1) in a transmission pause in which no load modulation of the carrier signal (CS) is performed by means of the one auxiliary carrier signal (SCS1) in the data carrier (2), and that the data carrier (D) is controlled to an other transmission mode in conformity with the evaluation of this transmission mode data block (MDB2, MDB3).

13. An integrated circuit (42) for a data carrier (D) for the contactless output of data (DA) to a write/read station (1), which integrated circuit includes:

connection means (43) for the connection of contactless operative transmitter means (41) which is coupled to contactless operative transmitter means (21) of the write/read station (1), where a carrier signal (CS) generated in the write/read station (1) is obtained in the circuit (42), in the coupled state, and also includes load modulation means (47) whereby the carrier signal (CS) is load modulated by means of one auxiliary carrier signal (SCS1) in a transmission mode for the transmission of a data block (DB) from the circuit (42) to the write/read station (1), characterized in that the circuit (42) includes evaluation means (67) for evaluating a transmission mode data block (MDB1, MDB2, MDB3) which is transmitted to the circuit (42) by the write/read station (1) and controls the circuit (42) to an other transmission mode in which load modulation of the carrier signal (CS) is performed by means of at least one other auxiliary carrier signal (SCS2) in order to transmit a data block (DB) from the circuit (42) to the write/read station (1), that the circuit (42) includes control means (68) which are influenced by the evaluation means (67) and whereby the circuit (42) is controlled, in conformity with an evaluated transmission mode data block (MDB1, MDB2, MDB3), to an other transmission mode in which, in order to transmit a data block (DB) from the circuit (42) to the write/read station (1) load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values, that the evaluation means (67) are arranged to evaluate a transmission mode data block (MDB2, MDB3) which is transmitted to the circuit (42) by a write/read station (1) if disturbances are detected in the write/read station (1), in the signal path beyond the demodulation means (25), on the basis of an error occurring during the load modulation of the carrier signal (CS) by means of the one auxiliary carrier signal (SCS1), and that the circuit (42) is controlled to an other transmission mode in conformity with the evaluation of this transmission mode data block (MDB2. MDB3).

14. An integrated circuit (42) as claimed in claim 13, characterized in that the circuit (42) includes evaluation means (67) whereby a transmission mode data block (MDB2), transmitted to the circuit (42) by the write/read station (1) is evaluated, which transmission mode data block controls the circuit (42) to an other transmission mode in which, in order to transmit a data block (DB) from the circuit (42) to the write/read station (1), load modulation of the carrier signal (CS) is performed only by means of the other auxiliary carrier signal (SCS2), and that the circuit (42) includes control means (68) which are influenced by the evaluation means (67) and whereby the circuit (42) is controlled, in conformity with an evaluated transmission mode data block (MDB2), to an other transmission mode in which, in order to transmit a data block (DB) from the circuit (42) to the write/read station (1), load modulation of the carrier signal (CS) is performed only by means of the other auxiliary carrier signal (SCS2).

15. An integrated circuit (42) as claimed in claim 13, characterized in that the circuit (42) includes evaluation means (67) whereby a transmission mode data block (MDB3) transmitted to the circuit 42 by the write/read station (1) is evaluated and controls the circuit (42) to an other transmission mode in which, in order to transmit a data block (DB) from the circuit (42) to the write/read station (1), load modulation of the carrier signal (CS) is performed by means of the one auxiliary carrier signal (SCS1) and the other auxiliary carrier signal (SCS2), and that the circuit (42) includes control means (68) which are influenced by the evaluation means (67) and whereby the circuit (42) is controlled, in conformity with an evaluated transmission mode data block (MDB3), to an other transmission mode in which, in order to transmit a data block (DB) from the circuit (42) to the write/read station (1), load Modulation of the carrier signal (CS) is performed by means of the one auxiliary carrier signal (SCS1) and the other auxiliary carrier signal (SCS1).

16. An integrated circuit (42) for a data carrier (D) for the contactless output of data (DA) to a write/read station (1), which integrated circuit includes:

connection means (43) for the connection of contactless operative transmitter means (41) which is coupled to contactless operative transmitter means (21) of the write/read station (1), where a carrier signal (CS) generated in the write/read station (1) is obtained in the circuit (42), in the coupled state, and also includes load modulation means (47) whereby the carrier signal (CS) is load modulated by means of one auxiliary carrier signal (SCS1) in a transmission mode for the transmission of a data block (DB) from the circuit (42) to the write/read station (1), characterized in that the circuit (42) includes evaluation means (67) for evaluating a transmission mode data block (MDB1, MDB2, MDB3) which is transmitted to the circuit (42) by the write/read station (1) and controls the circuit (42) to an other transmission mode in which load modulation of the carrier signal (CS) is performed by means of at least one other auxiliary carrier signal (SCS2) in order to transmit a data block (DB) from the circuit (42) to the write/read station (1), that the circuit (42) includes control means (68) which are influenced by the evaluation means (67) and whereby the circuit (42) is controlled, in conformity with an evaluated transmission mode data block (MDB1, MDB2, MDB3), to an other transmission mode in which, in order to transmit a data block (DB) from the circuit (42) to the write/read station (1) load modulation of the carrier signal (CS) is performed by means of at least one other auxiliary carrier signal (SCS2), the at least one frequency (f2) of the at least one other auxiliary carrier signal (SCS2) and the frequency (f1) of the one auxiliary carrier signal (SCS1) having different values, that the evaluation means (67) are arranged to evaluate a transmission mode data block (MDB2, MDB3) which is transmitted to the circuit (42) by a write/read station (1) if an interference signal imitating a useful signal is detected in the write/read station (1) in a transmission pause in which no load modulation of the carrier signal (CS) is performed by means of the one auxiliary carrier signal (SCS1) in the circuit (42), and that the circuit (42) is controlled to an other transmission mode in conformity with the evaluation of this transmission mode data block (MDB2, MDB3).

* * * * *